US012631726B2

(12) United States Patent
Zhuang et al.

(10) Patent No.: US 12,631,726 B2
(45) Date of Patent: May 19, 2026

(54) VEHICLE 4D MILLIMETER-WAVE RADAR INERTIAL ODOMETRY METHOD AND COMPUTER-READABLE MEDIUM

(71) Applicant: WUHAN UNIVERSITY, Wuhan (CN)

(72) Inventors: Yuan Zhuang, Wuhan (CN); Binliang Wang, Wuhan (CN); Jianzhu Huai, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 369 days.

(21) Appl. No.: 18/238,505

(22) Filed: Aug. 27, 2023

(65) Prior Publication Data

US 2024/0319337 A1 Sep. 26, 2024

(30) Foreign Application Priority Data

Mar. 13, 2023 (CN) .......................... 202310248651.1

(51) Int. Cl.
*G01S 7/41* (2006.01)
*G01S 7/02* (2006.01)
*G01S 13/58* (2006.01)

(52) U.S. Cl.
CPC .............. *G01S 7/418* (2013.01); *G01S 7/023* (2013.01); *G01S 13/584* (2013.01)

(58) Field of Classification Search
CPC ......... G01S 7/418; G01S 7/023; G01S 13/584
See application file for complete search history.

(56) References Cited

U.S. PATENT DOCUMENTS

| | | | |
|---|---|---|---|
| 11,859,979 B2 * | 1/2024 | Russell | ................ G01C 21/165 |
| 2017/0132334 A1 * | 5/2017 | Levinson | .............. B60W 50/00 |

(Continued)

FOREIGN PATENT DOCUMENTS

| | | | | |
|---|---|---|---|---|
| CN | 111929699 A | * | 11/2020 | ............. G01C 21/32 |
| CN | 112213703 A | * | 1/2021 | ........... G01S 13/958 |

(Continued)

OTHER PUBLICATIONS

Doer, C., Trommer, G.F., "x-RIO: Radar Inertial Odometry with Multiple Radar Sensors and Yaw Aiding," Gyroscopy Navig. 12, 329-339, https://doi.org/10.1134/S2075108721040039 (Year: 2021).*

(Continued)

*Primary Examiner* — William Kelleher
*Assistant Examiner* — Noah Yi Min Zhu
(74) *Attorney, Agent, or Firm* — SZDC Law PC

(57) ABSTRACT

Provided is a vehicle 4D millimeter-wave radar inertial odometry method and a computer-readable medium. The method includes: eliminating significant radar spatial noise through relaxation filtering; performing single-frame velocity measurement based on a selecting weight iteration-based robust estimation method, and eliminating dynamic noise; performing IMU observation integration by mechanical arrangement to obtain a predicted vehicle state; constructing velocity constraints based on single-frame velocity measurement and a predicted velocity to initially update the vehicle state; constructing a local map based on the previous point cloud frame, searching n-nearest neighbor points of each radar point in the local map at next moment, calculating a weighted distance from distribution to multi-distribution as matching constraints from point cloud to local map, and performing further updating based on iterative filtering to obtain a precise vehicle state; and updating the vehicle state at all moments by 4Dradar closed-loop detection and GICP to reduce the positioning drift.

9 Claims, 3 Drawing Sheets

(56) References Cited

U.S. PATENT DOCUMENTS

| | | | | |
|---|---|---|---|---|
| 2019/0163198 A1 * | 5/2019 | Niesen | .............. | G01C 21/1652 |
| 2020/0217666 A1 * | 7/2020 | Zhang | ................... | G05D 1/242 |
| 2023/0324543 A1 * | 10/2023 | Kulkarni | ................ | G06F 18/23 |

FOREIGN PATENT DOCUMENTS

| | | | | | |
|---|---|---|---|---|---|
| CN | | 115326068 A | * | 11/2022 | ............ G06V 20/64 |
| WO | WO-2023000294 A1 | * | | 1/2023 | ............ G01S 17/89 |

OTHER PUBLICATIONS

A. Venon, Y. Dupuis, p. Vasseur and p. Merriaux, "Millimeter Wave FMCW RADARs for Perception, Recognition and Localization in Automotive Applications: A Survey," in IEEE Transactions on Intelligent Vehicles, vol. 7, No. 3, pp. 533-555, Sep. 2022, doi: 10.1109/TIV.2022.3167733 (Year: 2022).*

Li Y, Liu Y, Wang Y, Lin Y, Shen W. The Millimeter-Wave Radar SLAM Assisted by the RCS Feature of the Target and IMU. Sensors (Basel). Sep. 22, 2020. doi: 10.3390/s20185421. PMID: 32971798; PMCID: PMC7570575. (Year: 2020).*

Y. S. Park, Y.- S. Shin and A. Kim, "PhaRaO: Direct Radar Odometry using Phase Correlation," 2020 IEEE International Conference on Robotics and Automation (ICRA), Paris, France, 2020, pp. 2617-2623, doi: 10.1109/ICRA40945.2020.9197231. (Year: 2020).*

G. Kim and A. Kim, "Scan Context: Egocentric Spatial Descriptor for Place Recognition Within 3D Point Cloud Map, " 2018 IEEE/ RSJ International Conference on Intelligent Robots and Systems (IROS), Madrid, Spain, 2018, pp. 4802-4809, doi: 10.1109/IROS. 2018.8593953. (Year: 2018).*

* cited by examiner 4D radar data preprocessing: eliminating significant radar spatial noise based on a relaxation filtering method, and performing single-frame velocity measurement based on a selecting weight iteration-based robust estimation method, and eliminating dynamic noise

↓

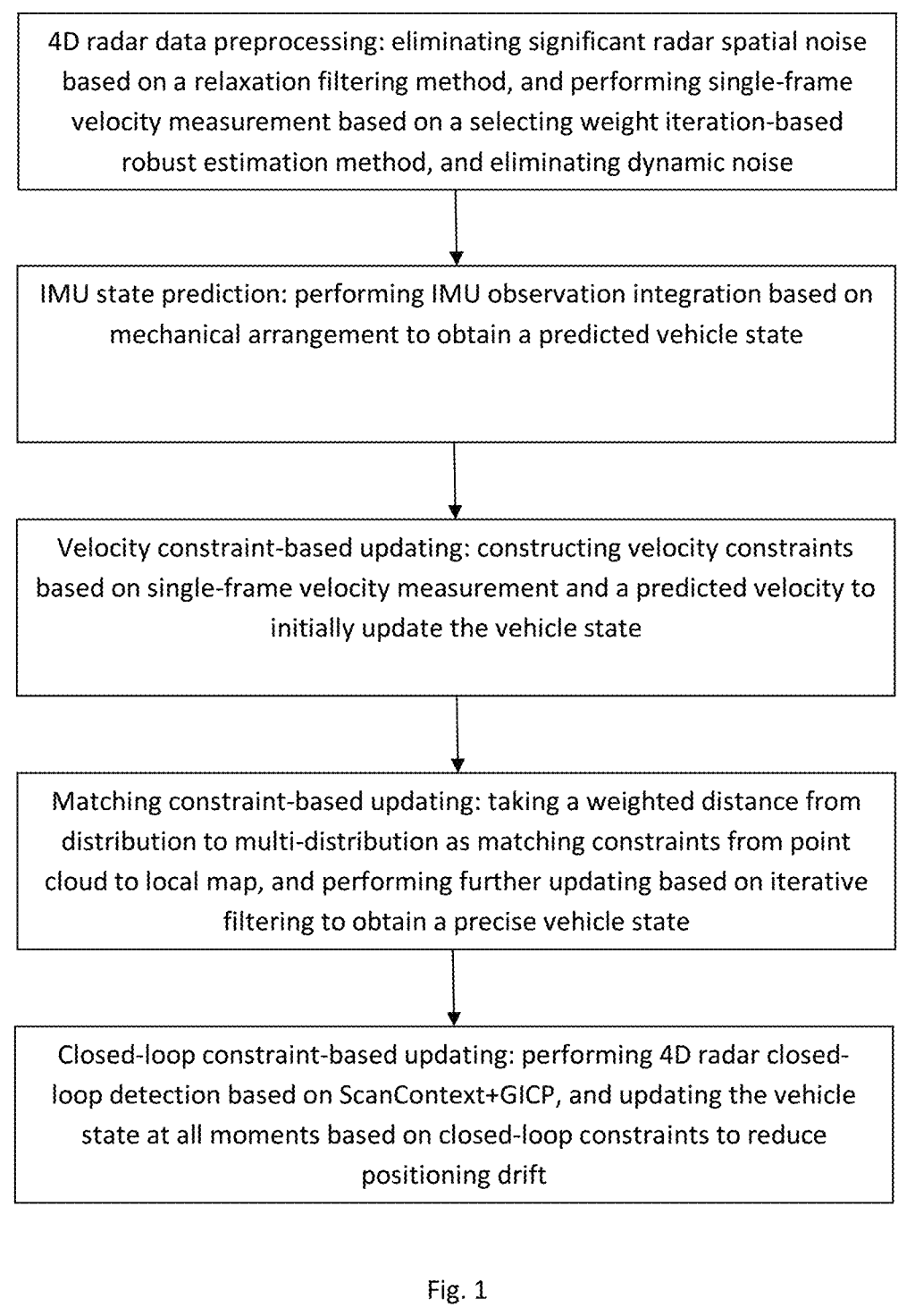

IMU state prediction: performing IMU observation integration based on mechanical arrangement to obtain a predicted vehicle state

↓

Velocity constraint-based updating: constructing velocity constraints based on single-frame velocity measurement and a predicted velocity to initially update the vehicle state

↓

Matching constraint-based updating: taking a weighted distance from distribution to multi-distribution as matching constraints from point cloud to local map, and performing further updating based on iterative filtering to obtain a precise vehicle state

↓

Closed-loop constraint-based updating: performing 4D radar closed-loop detection based on ScanContext+GICP, and updating the vehicle state at all moments based on closed-loop constraints to reduce positioning drift

Fig. 1

(a) trajectory recovery results (b) precision evaluation

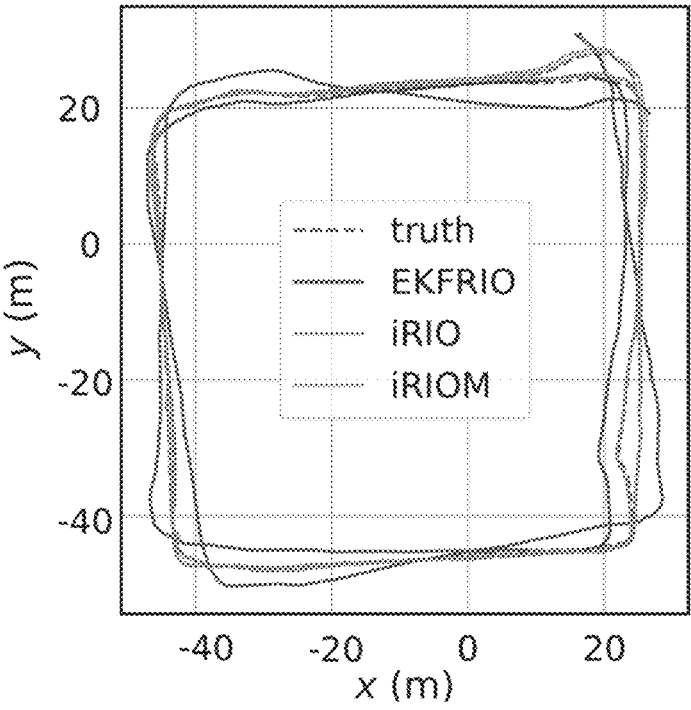
(a) trajectory recovery results
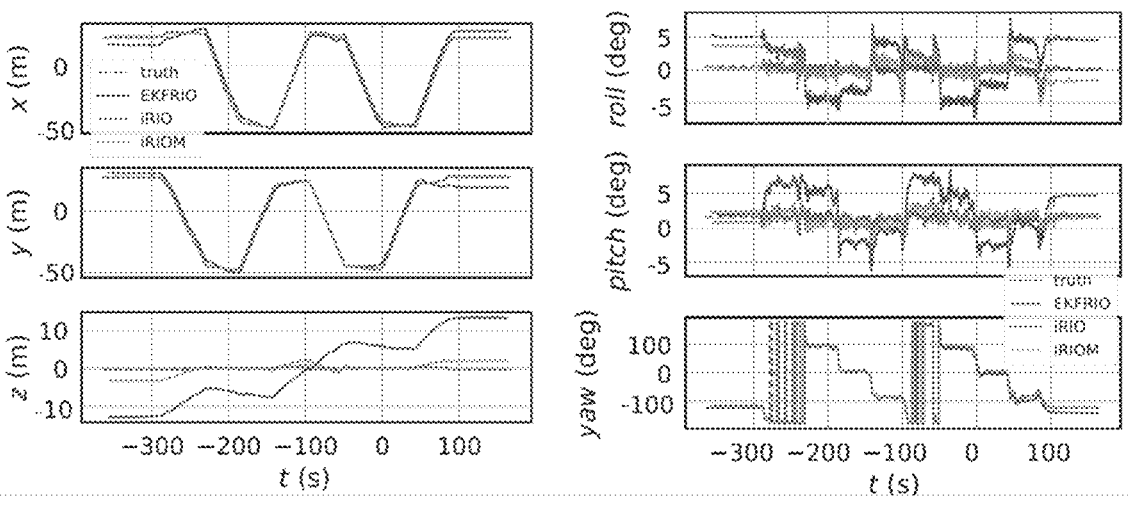
(b) precision evaluation
Fig. 3

VEHICLE 4D MILLIMETER-WAVE RADAR INERTIAL ODOMETRY METHOD AND COMPUTER-READABLE MEDIUM

This application claims priority to Chinese Patent Application No. 202310248651.1, filed on Mar. 13, 2023, which is incorporated by reference for all purposes as if fully set forth herein.

TECHNICAL FIELD

The present disclosure belongs to the technical field of vehicle state estimation, and particularly relates to a vehicle 4D millimeter-wave radar inertial odometry method and a computer-readable medium.

BACKGROUND

In recent years, autonomous driving and autonomous robots have developed rapidly. Positioning and navigation technology based on perceptual sensor data has always been a hot research direction in this field. At present, most self-driving cars use LiDAR and optical cameras as main sensors. These sensors can maintain good performance in good weather conditions, but have difficulties in working in bad weather conditions such as rain, snow and fog. The millimeter-wave radar has a longer wavelength, a larger FOV, has strong resistance to small particles such as dust, fog, rain and snow, can work better in the case that the visual environment deteriorates, and has a strong penetration ability to some materials. At the same time, the millimeter-wave radar can provide Doppler velocity observation, and can estimate the robot's ego-velocity through single frame data.

Compared with 3D millimeter-wave radar, the 4D imaging millimeter-wave radar greatly improves resolution in the vertical direction, increases the detection and analysis of target height, and can realize the information perception in four dimensions of distance, azimuth, height and velocity, and can better detect the outline of obstacles, surrounding environmental information, as well as better path planning and passable space detection functions. However, the 4D millimeter-wave radar has low spatial resolution and large sparsity of point clouds, and is affected by noise factors such as multipath effects and harmonics, thus it is difficult to achieve stable, continuous, high-precision data correlation. Therefore, high-precision three-dimensional spatial localization and mapping by millimeter-wave radar remains a challenging task.

SUMMARY

Aiming at the shortcomings of methods in the prior art, the present disclosure provides a vehicle 4D millimeter-wave radar inertial odometry method and a computer-readable medium.

The technical solution of the method of the present disclosure is a vehicle 4D millimeter-wave radar inertial odometry method, which specifically includes the following steps:

Step 1: acquiring a sequence of 4D radar observation data at a plurality of radar sampling moments according to a certain frequency, and performing significant multipath scattering and speckle noise point removal screening on a three-dimensional point cloud at each radar sampling moment through a spatial distance and a relaxation filtering method based on the local point cloud statistical characteristics to obtain a three-dimensional point cloud after relaxation filtering at each moment; and estimating a vehicle velocity in the radar local coordinate system at each moment by the three-dimensional point cloud after relaxation filtering at each moment and the Doppler velocity corresponding to each point in the point cloud through a selecting weight iteration-based minimum 2-norm method, and eliminating dynamic interference points still existing in the point cloud after relaxation filtering to obtain radar-preprocessed data at each moment;

Step 2: performing time integration on inertial navigation data of IMU observation subsequences synchronously acquired between adjacent radar sampling moments through a mechanical arrangement algorithm to obtain a predicted state at a next radar sampling moment;

Step 3: constructing a velocity error equation by the vehicle velocity in the radar local coordinate system estimated through the selecting weight iteration-based minimum 2-norm method in step 1 and a predicted vehicle velocity in the global coordinate system at the next radar sampling moment in step 2, obtaining a residual initial value at the next radar sampling moment and a Jacobian matrix at the next radar sampling moment through a linearized error equation, and preliminarily updating a vehicle state by using Kalman filtering to obtain a velocity-updated vehicle state at the next radar sampling moment;

Step 4: constructing a local map by three-dimensional point clouds of the radar-preprocessed data in the past multiple radar sampling moments through an ikdtree tree strategy, and obtaining n-nearest neighbor points, in the local map, of each three-dimensional point in the three-dimensional point cloud of the radar-preprocessed data at the next radar sampling moment through K-Nearest Neighbor (KNN) search in the local map; weighting the average Euclidean distance from each three-dimensional point in the three-dimensional point cloud of the radar-preprocessed data at the next sampling moment to the corresponding n-nearest neighbor points by the local point cloud spatial distribution covariance method to obtain the average weighted distance from distribution to multi-distribution, forming spatial point matching constraints from point cloud to local map, so as to construct a matching error equation and a linearized matching error equation, obtaining an initial value of a matching residual at the next radar sampling moment and a matching residual Jacobian matrix at the next radar sampling moment through the linearized matching error equation, constructing a maximum a posteriori estimation problem by considering matching constraints corresponding to all 4D radar-preprocessed data, and performing further updating based on iterative Kalman filtering to obtain a vehicle state with high precision;

Step 5: describing and retrieving a frame, that is most similar to a point cloud frame at the current moment, among historical radar point cloud frames by the Scan-Context feature; judging whether the similarity is greater than an established threshold, if the similarity is less than the threshold, discarding the closed loop, otherwise accepting the closed loop, calculating a three-dimensional projection transformation relationship between two point cloud frames using a GICP algorithm, and updating the vehicle state at all moments before by this spatial transformation relationship as closed-loop constraints.

Preferably, 4D radar observation data at each radar sampling moment in step 1 consists of a three-dimensional point cloud and the Doppler velocity of each three-dimensional observation point in the three-dimensional point cloud;

the 4D radar observation data at each radar sampling moment in step 1 is defined as:

$$\text{data}_i = \left\{ \left\{ \rho_{i,j}, v_{i,j}^d \right\}, j = 1 \ldots N \right\}$$

$$i \in [1, N_t]$$

$$\rho_{i,j} = (x_{i,j}, y_{i,j}, z_{i,j})$$

wherein, $\text{data}_i$ represents the 4D radar observation data at the ith radar sampling moment, $\rho_{i,j}$ represents the three-dimensional coordinates of the jth three-dimensional observation point in the three-dimensional point cloud of the 4D radar observation data at the ith radar sampling moment, $x_{i,j}$ represents the X-axis of the jth three-dimensional observation point in the three-dimensional point cloud of the 4D radar observation data at the ith radar sampling moment, $y_{i,j}$ represents the Y-axis of the jth three-dimensional observation point in the three-dimensional point cloud of the 4D radar observation data at the ith radar sampling moment, $z_{i,j}$ represents the Z-axis of the jth three-dimensional observation point in the three-dimensional point cloud of the 4D radar observation data at the ith radar sampling moment, $$v_{i,j}^d$$

represents the Doppler velocity observation of the jth three-dimensional observation point in the three-dimensional point cloud of the 4D radar observation data at the ith radar sampling moment, N represents the number of three-dimensional observation points in the three-dimensional point cloud of the 4D radar observation data at each radar sampling moment, and $N_t$ represents the number of radar sampling moments;

The selecting weight iteration-based minimum 2-norm method in step 1 is specifically as follows:

a robust estimation problem at each radar sampling moment is constructed, which is specifically as follows:

$$\min_{R_{v_{i_m}}} \sum_{j=1}^{N} \lambda_{i,j} \left\| v_{i,j}^d - \frac{\rho_{i,j}^T}{\|\rho_{i,j}\|} \cdot {}^R v_{i_m} \right\|$$

wherein $\lambda_{i,j}$ is the weight of the jth three-dimensional observation point in the three-dimensional point cloud of the 4D radar observation data at the ith radar sampling moment, $$v_{i,j}^d$$

represents the Doppler velocity observation of the jth observation point in the three-dimensional point cloud of the 4D radar observation data at the ith radar sampling moment, $\rho_{i,j}$ is the three-dimensional coordinates of the jth three-dimensional observation point in the three-dimensional point cloud of the 4D radar observation data at the ith radar sampling moment, $${}^R v_{i_m}$$

is the vehicle velocity in the radar local coordinate system at the ith radar sampling moment, and N represents the number of three-dimensional observation points in the three-dimensional point cloud of 4D radar observation data at each radar sampling moment;

in the first iteration, $\lambda_{i,j}=1$, and in subsequent iterations, $$\lambda_{i,j} = 1 / \left( \left\| v_{i,j}^d - \frac{\rho_{i,j}^T}{\|\rho_{i,j}\|} \cdot {}^R v_{i_m} \right\| + \epsilon \right),$$

wherein $\epsilon$ represents the iteration coefficient;

summation is performed through the selecting weight iteration-based minimum 2-norm method to obtain the vehicle velocity $$ {}^R v_{i_m}$$

in the radar local coordinate system at the ith radar sampling moment and a covariance matrix at the ith radar sampling moment, and an inverse value of the covariance matrix at the ith radar sampling moment is taken as an observed covariance $R_{i_{vel}}$ of the vehicle velocity in the radar local coordinate system at the ith radar sampling moment;

eliminating the dynamic interference points still existing in the point cloud after relaxation filtering to obtain radar-preprocessed data at each moment in step 1 specifically includes:

setting a weight threshold $\lambda_{th}$;

if $\lambda_{i,j} < \lambda_{th}$, taking three-dimensional observation points corresponding to $\rho_{i,j}$ as dynamic noise points, otherwise taking the three-dimensional observation points as static inline points;

obtaining a set of static inline observation points $$\left\{ \rho_{i,j}, v_{i,j}^d \right\},$$

that is, the radar-preprocessed data after the dynamic noise points are eliminated;

Preferably, the IMU observation subsequence synchronously acquired between adjacent radar sampling moments in step 2 is defined as:

$$S_i = \left( \mu_i^1, \mu_i^2, \ldots \mu_i^k \ldots, \mu_i^{N_{ij}} \right), \mu_i^k = \left( a_i^k, \omega_i^k \right)$$

$$i \in [1, N_t]$$

wherein $S_i$ represents the IMU observation subsequence between the ith radar sampling moment and the (i+1)th radar sampling moment, $$\mu_i^k$$

represents the kth IMU observation data in the IMU observation subsequence between the ith radar sampling moment and the (i+1)th radar sampling moment, $$a_i^k$$

represents the acceleration in the kth IMU observation data in the IMU observation subsequence between the ith radar sampling moment and the (i+1)th radar sampling moment, $$\omega_i^k$$

is the angular velocity in the kth IMU observation data in the IMU observation subsequence between the ith radar sampling moment and the (i+1)th radar sampling moment, $N_{i_I}$ represents the number of observations in the IMU subsequence, and $N_r$ represents the number of radar sampling moments;

the predicted state at the next radar sampling moment in step 2 is defined as:

$$\hat{x}_{i+1} = \left[ {}^G\hat{p}_{I_{i+1}}, {}^G\hat{v}_{I_{i+1}}, {}^G\hat{R}_{I_{i+1}}, \hat{b}_{a_{i+1}}, \hat{b}_{\omega_{i+1}}, {}^I\hat{R}_{R_{i+1}}, {}^I\hat{l}_{R_{i+1}}, {}^G\hat{g}_{i+1} \right]$$

wherein $\hat{x}_{i+1}$ represents the predicted state at the (i+1)th radar sampling moment, $$^G\hat{p}_{I_{i+1}}$$

represents the position predicted value at the (i+1)th radar sampling moment, $$^G\hat{v}_{I_{i+1}}$$

represents the velocity predicted value at the (i+1)th radar sampling moment, ${}^G\hat{R}_{I_{i+1}}$ represents the attitude predicted value at the (i+1)th radar sampling moment, $\hat{b}_{a_{i+1}}$ represents the acceleration bias predicted value at the (i+1)th radar sampling moment, $\hat{b}_{\omega_{i+1}}$ represents the angular velocity bias predicted value at the (i+1)th radar sampling moment, ${}^I\hat{R}_{R_{i+1}}$ represents the predicted value of the extrinsic parameter attitude between IMU and radar at the (i+1)th radar sampling moment, ${}^I\hat{l}_{R_{i+1}}$ represents the predicted value of the extrinsic parameter distance between IMU and radar at the (i+1)th radar sampling moment, and ${}^G\hat{g}_{i+1}$ represents the gravity vector predicted value in the global coordinate system at the (i+1)th radar sampling moment;

preferably, the velocity error equation in step 3 is defined as:

$$r_{i+1_{vel}} = {}^Rv_{i+1_m} - {}^Rv_{i+1}$$

-continued
$$^Rv_{i+1} = \left[ {}^IR_{R_{i+1}}^T \left( {}^GR_{I_{i+1}}^T {}^Gv_{i+1} + \left( \omega_{i+1} - b_{\omega_{i+1}} \right)_x \cdot {}^Il_{R_{i+1}} \right) \right]$$

wherein $r_{i+1_{vel}}$ is the velocity residual at the (i+1)th radar sampling moment, $$^Rv_{i+1_m}$$

is the vehicle velocity in the radar local coordinate system at the (i+1)th radar sampling moment, ${}^Rv_{i+1}$ is the velocity true value in the radar local coordinate system at the (i+1)th radar sampling moment, ${}^GR_{I_{i+1}}$ represents the attitude at the (i+1)th radar sampling moment, ${}^IR_{R_{i+1}}$ represents the rotational extrinsic parameter between IMU and radar at the (i+1)th radar sampling moment, ${}^Gv_{I_{i+1}}$ represents the velocity at the (i+1)th radar sampling moment, $\omega_{i+1}$ represents the angular velocity measured value at the (i+1)th radar sampling moment, $b_{\omega_{i+1}}$ represents the angular velocity bias at the (i+1)th radar sampling moment, $$^Il_{R_{i+1}}$$

represents the translational extrinsic parameter between IMU and radar at the (i+1)th radar sampling moment, $(\bullet)_x$ represents the vector cross product, and $(\bullet)^T$ represents transposition;

the linearized error equation in step 3 is defined as:

$$r_{i+1_{vel}} = \hat{r}_{i+1_{vel}} + H_{i+1_{vel}} \tilde{x}_{i+1}$$

$$\hat{r}_{i+1_{vel}} = {}^R\hat{v}_{i+1} - {}^Rv_{i+1_m}$$

wherein $r_{i+1_{vel}}$ represents the velocity residual at the (i+1)th radar sampling moment, $\hat{r}_{i+1_{vel}}$ represents the velocity residual initial value at the (i+1)th radar sampling moment, ${}^R\hat{v}_{i+1}$ is the IMU predicted value of the velocity in the radar local coordinate system at the (i+1)th radar sampling moment, $H_{i+1_{vel}}$ is the Jacobian matrix at the (i+1)th radar sampling moment, and $\tilde{x}_{i+1}$ is the error state at the (i+1)th radar sampling moment;

preferably, the matching error equation in step 4 is defined as $$r_{i+1_{pro}} = G_{i+1} \left( \sum_{\tau=1}^{n} {}^Gb_\tau / n - {}^GT_{R_{i+1}} \cdot \rho_{i+1} \right)$$

$$^GT_{R_{i+1}} = \begin{bmatrix} {}^GR_{I_{i+1}} & {}^Gl_{i+1} \\ 0_{1\times 3} & 1 \end{bmatrix} \begin{bmatrix} {}^IR_{R_{i+1}} & {}^Il_{R_{i+1}} \\ 0_{1\times 3} & 1 \end{bmatrix}$$

$$G_{i+1} = \left( \sum_{\tau=1}^{n} C_\tau^B / n + {}^GT_{R_{i+1}} \cdot C^A \cdot {}^GT_{R_{i+1}}^T \right)^{-\frac{1}{2}}$$

wherein $r_{i+1_{pro}}$ represents the point cloud matching residual, $\rho_{i+1}$ is the coordinates of the radar observation point in the radar coordinate system at the (i+1)th radar sampling moment, ${}^Gb_\tau$ is the coordinates of n-nearest neighbor points in the $\rho_{i+1}$ local map in the global coordinate system, and is a transformational matrix from the global coordinate system to the radar coordinate system, $G_{i+1}$ is the distance weighted matrix from distribution to multi-distribution at the (i+1)th radar sampling moment, $^{G}T_{R_{i+1}}$ is the transformation matrix from radar local coordinate system to global coordinate system, $^{G}R_{I_{i+1}}$ represents the attitude at the (i+1)th radar sampling moment, $^{G}l_{I_{i+1}}$ represents the position at the (i+1)th radar sampling moment, $^{I}R_{R_{i+1}}$ represents the rotational extrinsic parameter between IMU and radar at the (i+1)th radar sampling moment, $^{I}l_{R_{i+1}}$ is the rotational extrinsic parameter 1 between IMU and radar at the (i+1)th radar sampling moment, $0_{1\times3}$ represents a 0 vector with one row and three columns, $C^{A}$ is the spatial distribution covariance corresponding to the current point $\rho_{i+1}$, and $$C_{\tau}^{B}$$

is the spatial distribution covariance corresponding to the nearest neighbor point $^{G}b_{\tau}$.

The linearized matching error equation in step 4 is defined as:

$$r_{i+1_{pro}} = \hat{r}_{i+1_{pro}} + H_{i+1_{pro}}\tilde{x}_{i+1}$$

wherein $\hat{r}_{i+1_{pro}}$ is the initial value of the matching residual at the (i+1)th radar sampling moment, $H_{i+1_{pro}}$ is the matching Jacobian matrix at the (i+1)th radar sampling moment, and $\tilde{x}_{i+1}$ is the error state at the (i+1)th radar sampling moment;

the maximum a posteriori estimation problem of the matching constraints in step 4 is defined as:

$$\min_{\tilde{x}^{\kappa}}\left(\left\|(\hat{x}_{i+1}^{\kappa} \boxminus \bar{x}_{i+1_{vel}}) + J_{i+1}^{\kappa}\tilde{x}_{i+1}^{\kappa}\right\|_{P_{i+1_{vel}}^{-1}}^{2} + \right.$$

$$\left. \sum_{\zeta=1}^{\Pi}\left\|^{\zeta}T_{i+1_{pro}}^{\kappa} + {}^{\zeta}H_{i+1_{pro}}^{\kappa}\tilde{x}_{i+1}^{\kappa}\right\|_{\zeta R_{i+1_{pro}}^{-1}}^{2}\right)$$

wherein $x_{i+1_{vel}}$ is the state at the (i+1)th radar sampling moment after the velocity is updated, $\bar{P}_{i+1_{vel}}$ is the covariance matrix at the (i+1)th radar sampling moment after the velocity observation is updated, $$^{\zeta}R_{i+1_{pro}}^{-1}$$

is the observation noise of the $\zeta$th point in the processed data at the (i+1)th radar sampling moment, $\Pi$ is the number of effective observations in the radar point cloud frame at the (i+1)th radar sampling moment, $$\hat{x}_{i+1}^{\kappa}$$

is the state updated value obtained by the $\kappa$th iterative Kalman filtering at the (i+1)th radar sampling moment, $\tilde{x}_{i+1}^{\kappa}$ is the error state corresponding to the $\kappa$th iterative Kalman filtering at the (i+1)th radar sampling moment, $J_{i+1}^{\kappa} \boxminus \bar{x}_{i+1_{vel}}$ to $\tilde{x}^{\kappa}$ linearized Jacobian matrix, $$^{\zeta}\hat{r}_{i+1_{pro}}^{\kappa}$$

represents the initial value of the matching residual corresponding to the $\zeta$th radar observation point in the Kth iteration at the (i+1)th radar sampling moment, $$^{\zeta}H_{i+1_{pro}}^{\kappa}$$

represents the matching Jacobian matrix corresponding to the $\zeta$th radar observation point in the $\kappa$th iteration at the (i+1)th radar sampling moment, $\boxminus$ is the state quantity subtraction operation, in which the rotational state quantity conforms to the right multiplication inverse disturbance, and the others conform to the vector subtraction operation, and $\|\cdot\|$ represents the Euclidean distance.

The iterative Kalman updated system state in step 4 is defined as follows:

$$\hat{x}_{i+1}^{\kappa+1} = \hat{x}_{i+1}^{\kappa} \boxplus \left(-K_{i+i_{pro}}^{\kappa}r_{i+i_{pro}} + \right.$$

$$\left. \left(I - K_{i+i_{pro}}^{\kappa}H_{i+1_{pro}}^{\kappa}\right)(J^{\kappa})^{-1}\right)(\hat{x}_{i+1}^{\kappa} \boxminus \bar{x}_{i+1_{vel}})$$

$$P_{i+1}^{\kappa+1} = \left(I - K_{i+i_{pro}}^{\kappa}H_{i+1_{pro}}^{\kappa}\right)P_{i+1}^{\kappa}$$

wherein:

$$\hat{x}_{i+1}^{\kappa+1}$$

is the state obtained by the Kth iterative Kalman filtering at the (i+1)th radar sampling moment, $$K_{i+1_{pro}}^{\kappa}$$

is the matching Kalman gain of the Kth iteration filtering at the (i+1)th radar sampling moment, $r_{i+1_{pro}}$ represents the point cloud matching residual, I is identity matrix, $P_{i+1}$ is the covariance matrix updated by matching at the (i+1)th radar sampling moment, $$P_{i+1}^{\kappa}$$

is the covariance matrix updated by the $\kappa$th iterative filtering, $$P_{i+1}^{\kappa+1}$$

is the covariance matrix updated by the $\kappa$+1th iterative filtering, $$H_{i+1_{pro}}^{\kappa}$$

is the matching Jacobian matrix in the $\kappa$th iteration at the (i+1)th radar sampling moment, $\boxplus$ is a state quantity addition operation, in which the rotational state quantity conforms to the right multiplication disturbance and the others conform to the vector subtraction operation, and ⊟ is a state quantity subtraction operation.

The present disclosure also provides a computer-readable medium, which stores a computer program executed by an electronic device, and when running on the electronic device, the computer program causes the electronic device to execute the steps of the vehicle 4D millimeter-wave radar inertial odometry method.

The present disclosure has the advantages of innovatively providing a vehicle 3D pose robust estimation method base on 4D radar, weakening the influence of various radar noise on the positioning results, and effectively improving the matching precision and robustness of sparse radar point clouds.

BRIEF DESCRIPTION OF FIGURES

FIG. 1 is a flowchart of a method provided by embodiments of the present disclosure;

FIG. 3 is a comparison diagram of pose recovery results in the embodiments of the present disclosure.

DETAILED DESCRIPTION

Figure 2:
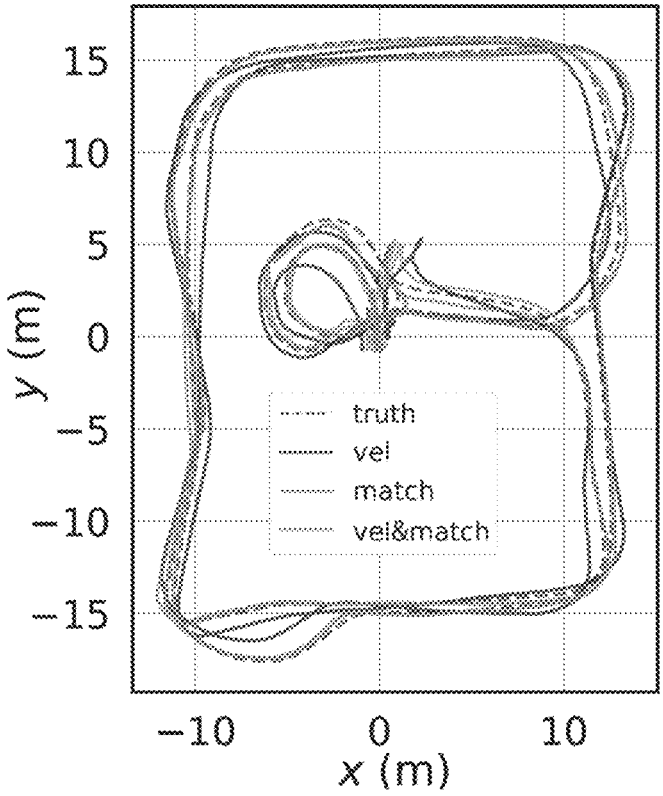
FIG. 2 is a comparison diagram of pose recovery effects of three constraint combination modes in the embodiments of the present disclosure.

The technical solution in the embodiments of the present disclosure will be clearly and completely described below in conjunction with the accompanying drawings. Obviously, the described embodiments are only a part of the embodiments of the present disclosure, but not all the embodiments. Based on the embodiments in the present disclosure, all other embodiments obtained by a person having ordinary skill in the art without creative labor belong to the scope of protection of the present disclosure.

During specific implementation, the method provided in the technical solution of the present disclosure may be automatically run by those skilled in the art using computer software technology, and system devices for realizing the method, such as computer-readable storage media for storing the corresponding computer program in the technical solution of the present disclosure and computer equipment for running the corresponding computer program, should also be within the protection scope of the present disclosure.

The technical solution of the embodiments of the present disclosure, which is a vehicle 4D millimeter-wave radar inertial odometry method, will be introduced with reference to FIGS. 1-3. FIG. 1 is a flowchart of the method of the embodiments of the present disclosure, and the specific steps are as follows:

Step 1: acquiring a sequence of 4D radar observation data at a plurality of radar sampling moments according to a certain frequency, and performing significant multipath scattering and speckle noise point removal screening on a three-dimensional point cloud at each radar sampling moment through a spatial distance and a relaxation filtering method based on the local point cloud statistical characteristics to obtain a three-dimensional point cloud after relaxation filtering at each moment; and estimating a vehicle velocity in the radar local coordinate system at each moment by the three-dimensional point cloud after relaxation filtering at each moment and the Doppler velocity corresponding to each point in the point cloud through a selecting weight iteration-based minimum 2-norm method, and eliminating dynamic interference points still existing in the point cloud after relaxation filtering to obtain radar-preprocessed data at each moment;

the 4D radar observation data at each radar sampling moment in step 1 consists of a three-dimensional point cloud and the Doppler velocity of each three-dimensional observation point in the three-dimensional point cloud;

the 4D radar observation data at each radar sampling moment in step 1 is defined as:

$$\text{data}_i = \{\{\rho_{i,j}, v_{i,d}^d\}, j = 1 \ldots N\}$$

$$i \in [1, N_t]$$

$$\rho_{i,j} = (x_{i,j}, y_{i,j}, z_{i,j})$$

wherein, $\text{data}_i$ represents the 4D radar observation data at the ith radar sampling moment, $\rho_{i,j}$ represents the three-dimensional coordinates of the jth three-dimensional observation point in the three-dimensional point cloud of the 4D radar observation data at the ith radar sampling moment, $x_{i,j}$ represents the X-axis of the jth three-dimensional observation point in the three-dimensional point cloud of the 4D radar observation data at the ith radar sampling moment, $y_{i,j}$ represents the Y-axis of the jth three-dimensional observation point in the three-dimensional point cloud of the 4D radar observation data at the ith radar sampling moment, $z_{i,j}$ represents the Z-axis of the jth three-dimensional observation point in the three-dimensional point cloud of the 4D radar observation data at the ith radar sampling moment, $$v_{i,j}^d$$

represents the Doppler velocity observation of the jth three-dimensional observation point in the three-dimensional point cloud of the 4D radar observation data at the ith radar sampling moment, N represents the number of three-dimensional observation points in the three-dimensional point cloud of the 4D radar observation data at each radar sampling moment, and $N_t$ represents the number of radar sampling moments;

the selecting weight iteration-based minimum 2-norm method in step 1 is specifically as follows:

a robust estimation problem at each radar sampling moment is constructed, which is specifically as follows:

$$\min_{R_{v_{i_m}}} \sum_{j=1}^{N} \lambda_{i,j} \left\| v_{i,j}^d - \frac{\rho_{i,j}^T}{\|\rho_{i,j}\|} \cdot {}^R v_{i_m} \right\|$$

wherein $\lambda_{i,j}$ is the weight of the jth three-dimensional observation point in the three-dimensional point cloud of the 4D radar observation data at the ith radar sampling moment, $$v_{i,j}^d$$

represents the Doppler velocity observation of the jth observation point in the three-dimensional point cloud of the 4D radar observation data at the ith radar sampling moment, $\rho_{i,j}$ is the three-dimensional coordinates of the jth three-dimensional observation point in the three-dimensional point cloud of the 4D radar observation data at the ith radar sampling moment, $$^R v_{i_m}$$

is the vehicle velocity in the radar local coordinate system at the ith radar sampling moment, and N represents the number of three-dimensional observation points in the three-dimensional point cloud of 4D radar observation data at each radar sampling moment;

in the first iteration, $\lambda_{i,j}=1$, and in subsequent iterations, $$\lambda_{i,j} = 1 \bigg/ \left( \left\| v_{i,j}^d - \frac{\rho_{i,j}^T}{\|\rho_{i,j}\|} \cdot {}^R v_{i_m} \right\| + \in \right),$$

wherein $\in$ represents the iteration coefficient;

summation is performed through the selecting weight iteration-based minimum 2-norm method to obtain the vehicle velocity $$^R v_{i_m}$$

in the radar local coordinate system at the ith radar sampling moment and a covariance matrix at the ith radar sampling moment, and an inverse value of the covariance matrix at the ith radar sampling moment is taken as an observed covariance $R_{i_{vel}}$ of the vehicle velocity in the radar local coordinate system at the ith radar sampling moment;

eliminating dynamic interference points still existing in the point cloud after relaxation filtering to obtain radar-preprocessed data at each moment in step 1 specifically includes:

setting a weight threshold $\lambda_{th}$;

if $\lambda_{i,j} < \lambda_{th}$, taking three-dimensional observation points corresponding to $\rho_{i,j}$ as dynamic noise points, otherwise taking the three-dimensional observation points as static inline points;

obtaining a set of static inline observation points $$\{\rho_{i,j}, v_{i,j}^d\},$$

that is, the radar-preprocessed data after the dynamic noise points are eliminated;

Step 2: performing time integration on inertial navigation data of IMU observation subsequences synchronously acquired between adjacent radar sampling moments through a mechanical arrangement algorithm to obtain a predicted state at the next radar sampling moment;

the IMU observation subsequence synchronously acquired between adjacent radar sampling moments in step 2 is defined as:

$$S_i = \left( \mu_i^1, \mu_i^2, \dots \mu_i^k \dots, \mu_i^{N_{ij}} \right), \mu_i^k = \left( a_i^k, \omega_i^k \right)$$

-continued
$$i \in [1, N_t]$$

wherein $S_i$ represents the IMU observation subsequence between the ith radar sampling moment and the (i+1)th radar sampling moment, $$\mu_i^k$$

represents the kth IMU observation data in the IMU observation subsequence between the ith radar sampling moment and the (i+1)th radar sampling moment, $$a_i^k$$

represents the acceleration in the kth IMU observation data in the IMU observation subsequence between the ith radar sampling moment and the (i+1)th radar sampling moment, $$\omega_i^k$$

is the angular velocity in the kth IMU observation data in the IMU observation subsequence between the ith radar sampling moment and the (i+1)th radar sampling moment, $N_{i_j}$ represents the number of observations in the IMU subsequence, and $N_t$ represents the number of radar sampling moments;

the predicted state at the next radar sampling moment in step 2 is defined as:

$$\hat{x}_{i+1} = \left[ {}^G \hat{p}_{I_{i+1}}, {}^G \hat{v}_{I_{i+1}}, {}^G \hat{R}_{I_{i+1}}, \hat{b}_{a_{i+1}}, \hat{b}_{\omega_{i+1}}, {}^I \hat{R}_{R_{i+1}}, {}^I \hat{l}_{R_{i+1}}, {}^G \hat{g}_{i+1} \right]$$

wherein $\hat{x}_{i+1}$ represents the predicted state at the (i+1)th radar sampling moment, ${}^G \hat{p}_{I_{i+1}}$ represents the position predicted value at the (i+1)th radar sampling moment, ${}^G \hat{v}_{I_{i+1}}$ represents the velocity predicted value at the (i+1)th radar sampling moment, ${}^G \hat{R}_{I_{i+1}}$ represents the attitude predicted value at the (i+1)th radar sampling moment, $\hat{b}_{a_{i+1}}$ represents the acceleration bias predicted value at the (i+1)th radar sampling moment, $\hat{b}_{\omega_{i+1}}$ represents the angular velocity bias predicted value at the (i+1)th radar sampling moment, ${}^I \hat{R}_{R_{i+1}}$ represents the predicted value of the extrinsic parameter attitude between IMU and radar at the (i+1)th radar sampling moment, ${}^I \hat{l}_{R_{i+1}}$ represents the predicted value of the extrinsic parameter distance between IMU and radar at the (i+1)th radar sampling moment, and ${}^G \hat{g}_{i+1}$ represents the gravity vector predicted value in the global coordinate system at the (i+1)th radar sampling moment;

Step 3: constructing a velocity error equation by the vehicle velocity in the radar local coordinate system estimated through the selecting weight iteration-based minimum 2-norm method in step 1 and the predicted vehicle velocity in the global coordinate system at the next radar sampling moment in step 2, obtaining a residual initial value at the next radar sampling moment and a Jacobian matrix at the next radar sampling moment by a linearized error equation, and preliminarily updating a vehicle state by using Kalman filtering to obtain a velocity-updated vehicle state at the next radar sampling moment;

the velocity error equation in step 3 is defined as:

$$r_{i+1_{vel}} = {}^{R}v_{i+1_m} - {}^{R}v_{i+1}$$

$$^{R}v_{i+1} = \left[ {}^{I}R_{R_{i+1}}{}^{T}\left( {}^{G}R_{I_{i+1}}{}^{T}{}^{G}v_{I_{i+1}} + \left(\omega_{i+1} - b_{\omega_{i+1}}\right)_{\times} \cdot {}^{I}l_{R_{i+1}}\right)\right]$$

wherein $r_{i+1_{vel}}$ is the velocity residual at the (i+1)th radar sampling moment, $$^{R}v_{i+1_m}$$

is the vehicle velocity in the radar local coordinate system at the (i+1)th radar sampling moment, $^{R}v_{i+1}$ is the velocity true value in the radar local coordinate system at the (i+1)th radar sampling moment, $^{G}R_{I_{i+1}}$ represents the attitude at the (i+1)th radar sampling moment, $^{I}R_{R_{i+1}}$ represents the rotational extrinsic parameter between IMU and radar at the (i+1)th radar sampling moment, $^{G}v_{I_{i+1}}$ represents the velocity at the (i+1)th radar sampling moment, $\omega_{i+1}$ represents the angular velocity measured value at the (i+1)th radar sampling moment, $b_{\omega_{i+1}}$ represents the angular velocity bias at the (i+1)th radar sampling moment, $^{I}l_{R_{i+1}}$ represents the translational extrinsic parameter between IMU and radar at the (i+1)th radar sampling moment, $(\bullet)_{\times}$ represents the vector cross product, and $(\bullet)^{T}$ represents transposition;

the linearized error equation in step 3 is defined as:

$$r_{i+1_{vel}} = \hat{r}_{i+1_{vel}} + H_{i+1_{vel}}\tilde{x}_{i+1}$$

$$\hat{r}_{i+1_{vel}} = {}^{R}\hat{v}_{i+1} + {}^{R}v_{i+1_m}$$

wherein $r_{i+1_{vel}}$ represents the velocity residual at the (i+1)th radar sampling moment, $\hat{r}_{i+1_{vel}}$ represents the velocity residual initial value at the (i+1)th radar sampling moment, $^{R}\hat{v}_{i+1}$ is the IMU predicted value of the velocity in the radar local coordinate system at the (i+1)th radar sampling moment, $H_{i+1_{vel}}$ is the Jacobian matrix at the (i+1)th radar sampling moment, and $\tilde{x}_{i+1}$ is the error state at the (i+1)th radar sampling moment;

Step 4: constructing a local map by three-dimensional point clouds of the radar-preprocessed data in the past multiple radar sampling moments through an ikdtree tree strategy, and obtaining n n-nearest neighbor points, in the local map, of each three-dimensional point in the three-dimensional point cloud of the radar-preprocessed data at the next radar sampling moment through K-Nearest Neighbor (KNN) search in the local map; weighting the average Euclidean distance from each three-dimensional point in the three-dimensional point cloud of the radar-preprocessed data at the next sampling moment to the corresponding n-nearest neighbor points by the local point cloud spatial distribution covariance method to obtain the average weighted distance from distribution to multi-distribution, forming spatial point matching constraints from point cloud to local map, so as to construct a matching error equation and a linearized matching error equation, obtaining an initial value of a matching residual at the next radar sampling moment and a matching residual Jacobian matrix at the next radar sampling moment through the linearized matching error equation, constructing a maximum a posteriori estimation problem by considering matching constraints corresponding to all 4D radar-preprocessed data, and performing further updating based on iterative Kalman filtering to obtain a vehicle state with high precision;

As shown in FIG. 2, compared with only using the velocity constraints (vel) in step 3 and only using the matching constraints (match) in step 4, the iRIO method with both velocity constraints and matching constraints can significantly reduce the positioning error and improve the robustness of the algorithm.

the matching error equation in step 4 is defined as $$r_{i+1_{pro}} = G_{i+1}\left(\sum\nolimits_{\tau=1}^{n}{}^{G}b_{\tau}/n - {}^{G}T_{R_{i+1}}\cdot\rho_{i+1}\right)$$

$$^{G}T_{R_{i+1}} = \begin{bmatrix} {}^{G}R_{I_{i+1}} & {}^{G}l_{I_{i+1}} \\ 0_{1\times3} & 1 \end{bmatrix}\begin{bmatrix} {}^{I}R_{R_{i+1}} & {}^{I}l_{R_{i+1}} \\ 0_{1\times3} & 1 \end{bmatrix}$$

$$G_{i+1} = \left(\sum\nolimits_{\tau=1}^{n}C_{\tau}^{B}/n + {}^{G}T_{R_{i+1}}\cdot C^{A}\cdot{}^{G}T_{R_{i+1}}{}^{T}\right)^{-\frac{1}{2}}$$

wherein $r_{i+1_{pro}}$ represents the point cloud matching residual, $\rho_{i+1}$ is the coordinates of the radar observation point in the radar coordinate system at the (i+1)th radar sampling moment, $^{G}b_{\tau}$ is the coordinates of n-nearest neighbor points in the $\rho_{i+1}$ local map in the global coordinate system, n=5 is the number of nearest neighbor points, $G_{i+1}$ is the distance weighted matrix from distribution to multi-distribution at the (i+1)th radar sampling moment, $^{G}T_{R_{i+1}}$ is the transformation matrix from radar local coordinate system to global coordinate system, $^{G}R_{I_{i+1}}$ represents the attitude at the (i+1)th radar sampling moment, $^{G}l_{I_{i+1}}$ represents the position at the (i+1)th radar sampling moment, $^{I}R_{R_{i+1}}$ represents the rotational extrinsic parameter between IMU and radar at the (i+1)th radar sampling moment, $^{I}l_{R_{i+1}}$ is the rotational extrinsic parameter between IMU and radar at the (i+1)th radar sampling moment, $0_{1\times3}$ represents a 0 vector with one row and three columns, $C^{A}$ is the spatial distribution covariance corresponding to the current point $\rho_{i+1}$, and $$C_{\tau}^{B}$$

is the spatial distribution covariance corresponding to the nearest neighbor point $^{G}b_{\tau}$.

The linearized matching error equation in step 4 is defined as:

$$r_{i+1_{pro}} = \hat{r}_{i+1_{pro}} + H_{i+1_{pro}}\tilde{x}_{i+1}$$

wherein $\hat{r}_{i+1_{pro}}$ is the initial value of the matching residual at the (i+1)th radar sampling moment, $H_{i+1_{pro}}$ is the matching Jacobian matrix at the (i+1)th radar sampling moment, and $\tilde{x}_{i+1}$ is the error state at the (i+1)th radar sampling moment;

the maximum a posteriori estimation problem of the matching constraints in step 4 is defined as:

The iterative Kalman updated system state in step 4 is defined as follows:

$$\min_{\tilde{x}^K}\left( \left\|(\hat{x}_{i+1}^K \boxminus \bar{x}_{i+1_{vel}}) + J_{i+1}^K \tilde{x}_{i+1}^K\right\|_{\bar{P}_{i+1_{vel}}^{-1}}^2 + \right.$$

$$\left. \sum_{\zeta=1}^{\Pi} \left\|{}^\zeta \hat{r}_{i+1_{pro}}^K + {}^\zeta H_{i+1_{pro}}^K x_{i+1_{pro}}^K\right\|_{\zeta R_{i+1_{pro}}^{-1}}^2 \right)$$

wherein $\bar{x}_{i+1_{vel}}$ is the state at the (i+1)th radar sampling moment after the velocity is updated, $\bar{P}_{i+1_{vel}}$ is the covariance matrix at the (i+1)th radar sampling moment after the velocity observation is updated, $$^\zeta R_{i+1_{pro}}^{-1}$$

is the observation noise of the $\zeta$th point in the processed data at the (i+1)th radar sampling moment, $\Pi$ is the number of effective observations in the radar point cloud frame at the (i+1)th radar sampling moment, $$\hat{x}_{i+1}^K$$

is the state updated value obtained by the kth iterative Kalman filtering at the (i+1)th radar sampling moment, $$\tilde{x}_{i+1}^K$$

is the error state corresponding to the kth iterative Kalman filtering at the (i+1)th radar sampling moment, $$J_{i+1}^K \text{ is a } \hat{x}_{i+1}^K \boxminus \bar{x}_{i+1_{vel}}$$

to $\tilde{x}^K$ linearized Jacobian matrix, $$^\zeta \hat{r}_{i+1_{pro}}^K$$

represents the initial value of the matching residual corresponding to the $\zeta$th radar observation point in the kth iteration at the (i+1)th radar sampling moment, $$^\zeta H_{i+1_{pro}}^K$$

represents the matching Jacobian matrix corresponding to the $\zeta$th radar observation point in the kth iteration at the (i+1)th radar sampling moment, $\boxminus$ is the state quantity subtraction operation, in which the rotational state quantity conforms to the right multiplication inverse disturbance, and the others conform to the vector subtraction operation, and $\|\cdot\|$ represents the Euclidean distance.

The iterative Kalman updated system state in step 4 is defined as follows:

$$\hat{x}_{i+1}^{K+1} = \hat{x}_{i+1}^K \boxplus \left(-K_{i+1_{pro}}^K r_{i+1_{pro}} + (I - K_{i+1_{pro}}^K H_{i+1_{pro}}^K)(J^K)^{-1})(\hat{x}_{i+1}^K \boxminus \bar{x}_{i+1_{vel}})\right)$$

$$P_{i+1}^{K+1} = (I - K_{i+1_{pro}}^K H_{i+1_{pro}}^K)P_{i+1}^K$$

wherein:

$$\hat{x}_{i+1}^{K+1}$$

is the state obtained by the kth iterative Kalman filtering at the (i+1)th radar sampling moment, $$K_{i+1_{pro}}^K$$

is the matching Kalman gain of the $\kappa$th iteration filtering at the (i+1)th radar sampling moment, $r_{i+1_{pro}}^\kappa$ represents the point cloud matching residual, I is identity matrix, $P_{i+1}$ is the covariance matrix updated by matching at the (i+1)th radar sampling moment, $$P_{i+1}^K$$

is the covariance matrix updated by the $\kappa$th iterative filtering, $$P_{i+1}^{K+1}$$

is the covariance matrix updated by the $\kappa$+1th iterative filtering, $$H_{i+1_{pro}}^K$$

is the matching Jacobian matrix in the $\kappa$th iteration at the (i+1)th radar sampling moment, $\boxplus$ is a state quantity addition operation, in which the rotational state quantity conforms to the right multiplication disturbance and the others conform to the vector subtraction operation, and $\boxminus$ is a state quantity subtraction operation.

Step 5: describing and retrieving a frame, that is most similar to a point cloud frame at the current moment, among historical radar point cloud frames by the Scan-Context feature; judging whether the similarity is greater than an established threshold, if the similarity is less than the threshold, discarding the closed loop, otherwise accepting the closed loop, calculating a three-dimensional projection transformation relationship between two point cloudframes using a GICP algorithm, and updating the vehicle state at all moments before by taking this spatial transformation relationship as a closed-loop constraints.

As shown in FIG. 3, the pose recovery precision of an iRIOM method with closed-loop constraint-based updating is obviously superior to an iRIO without closed-loop constraints and an existing EKFRIO method.

The specific embodiments of the present disclosure further provide a computer-readable medium.

The computer-readable medium is a server workstation; the server workstation stores a computer program executed by an electronic device, and when running on the electronic device, the computer program causes the electronic device to execute the steps of the vehicle 4D millimeter-wave radar inertial odometry method according to the embodiments of the present disclosure.

It should be understood that the parts not elaborated in detail in this description belong to the prior art.

It should be understood that the above detailed description of the preferred embodiments should not be regarded as a limitation on the patent protection scope of the present disclosure. Under the inspiration of the present disclosure, a person having ordinary skill in the art can make substitutions or modifications to the present disclosure without departing from the scope protected by the claims of the present disclosure, all of which fall within the protection scope of the present disclosure, which should be subject to the appended claims.

What is claimed is:

1. A vehicle 4D millimeter-wave radar inertial odometry method, comprising the following steps:

Step 1: acquiring a sequence of 4D radar observation data at a plurality of radar sampling moments according to a certain frequency, and performing multipath scattering and speckle noise point removal screening on a three-dimensional point cloud at each radar sampling moment through a spatial distance and a relaxation filtering method based on the local point cloud statistical characteristics to obtain a three-dimensional point cloud after relaxation filtering at each moment; and estimating a vehicle velocity in the radar local coordinate system at each moment by the three-dimensional point cloud after relaxation filtering at each moment and the Doppler velocity corresponding to each point in the point cloud through a selecting weight iteration-based minimum 2-norm method, and eliminating dynamic interference points still existing in the point cloud after relaxation filtering to obtain radar-preprocessed data at each moment;

Step 2: performing time integration on inertial navigation data of an inertial measurement unit (IMU) observation subsequence synchronously acquired between adjacent radar sampling moments through a mechanical arrangement algorithm to obtain a predicted state at a next radar sampling moment;

Step 3: constructing a velocity error equation by the vehicle velocity in the radar local coordinate system estimated through the selecting weight iteration-based minimum 2-norm method and a predicted vehicle velocity in a global coordinate system at a next radar sampling moment, obtaining a residual initial value at the next radar sampling moment and a Jacobian matrix at the next radar sampling moment by a linearized error equation, and preliminarily updating a vehicle state by using Kalman filtering to obtain a velocity-updated vehicle state at the next radar sampling moment;

Step 4: acquiring n-nearest neighbor points, in a local map, of each three-dimensional point in the three-dimensional point cloud of the radar-preprocessed data at the next radar sampling moment, constructing a spatial point matching constraint from point cloud to local map, a matching error equation and a linearized matching error equation, obtaining a matching residual initial value at the next radar sampling moment and a matching residual Jacobian matrix at the next radar sampling moment through the linearized matching error equation, constructing a maximum a posteriori estimation problem by considering matching constraints corresponding to all 4D radar-preprocessed data, and performing further updating based on iterative Kalman filtering to obtain a vehicle state with precision; and Step 5: describing and retrieving a frame, from among historical radar point cloud frames, that is most similar to a point cloud frame at a current moment by a ScanContext feature; judging whether a similarity is greater than an established threshold, under the condition that the similarity is less than the threshold, discarding a closed loop, otherwise accepting the closed loop, calculating a three-dimensional projection transformation relationship between two point cloud frames using a Generalized Iterative Closest Point (GICP) algorithm, and updating the vehicle state at all moments before by taking the projection transformation relationship as a closed-loop constraint.

2. The vehicle 4D millimeter-wave radar inertial odometry method according to claim 1, wherein:

performing significant multipath scattering and speckle noise point removal screening through a spatial distance and a relaxation filtering method based on local point cloud statistical characteristics to obtain a three-dimensional point cloud after relaxation filtering at each moment in step 1 specifically comprises:

acquiring a sequence of 4D radar observation data at a plurality of radar sampling moments at a certain frequency, and performing multipath scattering and speckle noise point removal screening on the three-dimensional point cloud at each radar sampling moment through a spatial distance and a relaxation filtering method based on local point cloud statistical characteristics to obtain a three-dimensional point cloud after relaxation filtering at each moment;

wherein the 4D radar observation data at each radar sampling moment consists of a three-dimensional point cloud and a Doppler velocity of each three-dimensional observation point in the three-dimensional point cloud;

the 4D radar observation data at each radar sampling moment is defined as:

$$\text{data}_i = \{\{\rho_{i,j}, v_{i,j}^d\}, j = 1 \ \dots \ N\}$$

$$i \in [1, N_t]$$

$$\rho_{i,j} = (x_{i,j}, y_{i,j}, z_{i,j})$$

wherein, $\text{data}_i$ represents the 4D radar observation data at the ith radar sampling moment, $\rho_{i,j}$ represents the three-dimensional coordinates of the jth three-dimensional observation point in the three-dimensional point cloud of the 4D radar observation data at the ith radar sampling moment, $x_{i,j}$ represents the X-axis of the jth three-dimensional observation point in the three-dimensional point cloud of the 4D radar observation data at the ith radar sampling moment, $y_{i,j}$ represents the Y-axis of the jth three-dimensional observation point in the three-dimensional point cloud of the 4D radar observation data at the ith radar sampling moment, $z_{i,j}$ represents the Z-axis of the jth three-dimensional observation point in the three-dimensional point cloud of the 4D radar observation data at the ith radar sampling moment, represents the $$v_{i,j}^d$$

represents the Doppler velocity observation of the jth three-dimensional observation point in the three-dimensional point cloud of the 4D radar observation data at the ith radar sampling moment, N represents the number of three-dimensional observation points in the three-dimensional point cloud of the 4D radar observation data at each radar sampling moment, and $N_t$ represents the number of radar sampling moments.

3. The vehicle 4D millimeter-wave radar inertial odometry method according to claim 2, wherein:

estimating a vehicle velocity in the radar local coordinate system at each moment through a selecting weight iteration-based minimum 2-norm method, and obtaining radar-preprocessed data at each moment in step 1 specifically comprises:

estimating a vehicle velocity in the radar local coordinate system at each moment by the three-dimensional point cloud after relaxation filtering at each moment and the Doppler velocity corresponding to each point in the point cloud through the selecting weight iteration-based minimum 2-norm method, and eliminating dynamic interference points still existing in the point cloud after relaxation filtering to obtain radar-preprocessed data at each moment.

4. The vehicle 4D millimeter-wave radar inertial odometry method according to claim 3, wherein:

the selecting weight iteration-based minimum 2-norm method is specifically as follows:

a robust estimation problem at each radar sampling moment is constructed, which is specifically as follows:

$$\min_{R_{V_{i_m}}} \sum_{j=1}^{N} \lambda_{i,j} \left\| v_{i,j}^d - \frac{\rho_{i,j}^T}{\|\rho_{i,j}\|} \cdot R_{V_{i_m}} \right\|$$

wherein $\lambda_{i,j}$ the weight of the jth three-dimensional observation point in the three-dimensional point cloud of the 4D radar observation data at the ith radar sampling moment, $$v_{i,j}^d$$

represents the Doppler velocity observation of the jth observation point in the three-dimensional point cloud of the 4D radar observation data at the ith radar sampling moment, $\rho_{i,j}$ is the three-dimensional coordinates of the jth three-dimensional observation point in the three-dimensional point cloud of the 4D radar observation data at the ith radar sampling moment, $$R_{V_{i_m}}$$

is the vehicle velocity in the radar local coordinate system at the ith radar sampling moment, and N represents the number of three-dimensional observation points in the three-dimensional point cloud of 4D radar observation data at each radar sampling moment;

in the first iteration, $\Delta_{i,j}=1$, and in subsequent iterations, $$\lambda_{i,j} = 1 / \left( \left\| v_{i,j}^d - \frac{\rho_{i,j}^T}{\|\rho_{i,j}\|} \cdot R_{V_{i_m}} \right\| + \epsilon \right),$$

wherein $\epsilon$ represents the iteration coefficient;

summation is performed through the selecting weight iteration-based minimum 2-norm method to obtain the vehicle velocity $$R_{V_{i_m}}$$

in the radar local coordinate system at the ith radar sampling moment and a covariance matrix at the ith radar sampling moment, and an inverse value of the covariance matrix at the ith radar sampling moment is taken as an observed covariance $R_{i_{vel}}$ of the vehicle velocity in the radar local coordinate system at the ith radar sampling moment;

eliminating dynamic interference points still existing in the point cloud after relaxation filtering to obtain radar-preprocessed data at each moment in step 1 specifically comprises:

setting a weight threshold $\lambda_{th}$, taking three-dimensional observation points corresponding to $\rho_{i,j}$ as dynamic noise points under the condition that $\lambda_{i,j} < \lambda_{th}$, otherwise taking the three-dimensional observation points as static inline points; and obtaining a set of static inline observation points $$\{\rho_{i,j}, v_{i,j}^d\},$$

that is, the radar-preprocessed data after the dynamic noise points are eliminated.

5. The vehicle 4D millimeter-wave radar inertial odometry method according to claim 4, wherein:

the IMU observation subsequence synchronously acquired between adjacent radar sampling moments in step 2 is defined as:

$$S_i = \left( \mu_i^1, \mu_i^2, \dots \mu_i^k, \dots, \mu_i^{N_{iJ}} \right), \mu_i^k = \left( a_i^k, \omega_i^k \right) \ i \in [1, N_t]$$

wherein $S_i$ represents the IMU observation subsequence between the ith radar sampling moment and the (i+1)th radar sampling moment, $$\mu_i^k$$

represents the kth IMU observation data in the IMU observation subsequence between the ith radar sampling moment and the (i+1)th radar sampling moment, $$a_i^k$$

represents the acceleration in the kth IMU observation data in the IMU observation subsequence between the ith radar sampling moment and the (i+1)th radar sampling moment, $$\omega_i^k$$

is the angular velocity in the kth IMU observation data in the IMU observation subsequence between the ith radar sampling moment and the (i+1)th radar sampling moment, $N_{i_1}$ represents the number of observations in the IMU subsequence, and $N_r$ represents the number of radar sampling moments;

the predicted state at the next radar sampling moment in step 2 is defined as:

$$\hat{x}_{i+1} = [{}^G\hat{p}_{I_{i+1}}, {}^G\hat{v}_{I_{i+1}}, {}^G\hat{R}_{I_{i+1}}, \hat{b}_{a_{i+1}}, \hat{b}_{\omega_{i+1}}, {}^I\hat{R}_{R_{i+1}}, {}^I\hat{l}_{R_{i+1}}, {}^G\hat{g}_{i+1}]$$

wherein $\hat{x}_{i+1}$ represents the predicted state at the (i+1)th radar sampling moment, ${}^G\hat{p}_{I_{i+1}}$ represents the position predicted value at the (i+1)th radar sampling moment, represents the velocity predicted value at the (i+1)th radar sampling moment, ${}^G\hat{R}_{I_{i+1}}$ represents the attitude predicted value at the (i+1)th radar sampling moment, $\hat{b}_{a_{i+1}}$ represents the acceleration bias predicted value at the (i+1)th radar sampling moment, $\hat{b}_{\omega_{i+1}}$ represents the angular velocity bias predicted value at the (i+1)th radar sampling moment, ${}^I\hat{R}_{R_{i+1}}$ represents the predicted value of the extrinsic parameter attitude between IMU and radar at the (i+1)th radar sampling moment, ${}^I\hat{l}_{R_{i+1}}$ represents the predicted value of the extrinsic parameter distance between IMU and radar at the (i+1)th radar sampling moment, and ${}^G\hat{g}_{i+1}$ represents the gravity vector predicted value in the global coordinate system at the (i+1)th radar sampling moment.

6. The vehicle 4D millimeter-wave radar inertial odometry method according to claim 5, wherein:
the velocity error equation in step 3 is defined as:

$$r_{i+1_{vel}} = {}^R V_{i+1_m} - {}^R V_{i+1}$$

$$R_{V_{i+1}} = [{}^I R_{R_{i+1}}^T ({}^G R_{I_{i+1}}^T {}^G V_{I_{i+1}} + (\omega_{i+1} - b_{\omega_{i+1}})_x \cdot {}^I l_{R_{i+1}})]$$

wherein $r_{i+1_{vel}}$ is the velocity residual at the (i+1)th radar sampling moment, $${}^R V_{i+1_m}$$

is the vehicle velocity in the radar local coordinate system at the (i+1)th radar sampling moment, $R_{V_{i+1}}$ is the velocity true value in the radar local coordinate system at the (i+1)th radar sampling moment, $${}^G R_{I_{i+1}}$$

represents the attitude at the (i+1)th radar sampling moment, ${}^I R_{R_{i+1}}$ represents the rotational extrinsic parameter between IMU and radar at the (i+1)th radar sampling moment, $${}^G v_{I_{i+1}}$$

represents the velocity at the (i+1)th radar sampling moment, $\omega_{i+1}$ represents the angular velocity measured value at the (i+1)th radar sampling moment, $b_{\omega_{i+1}}$ represents the angular velocity bias at the (i+1)th radar sampling moment, ${}^I l_{R_{i+1}}$ represents the translational extrinsic parameter between IMU and radar at the (i+1)th radar sampling moment, $(\cdot)_x$ represents the vector cross product, and $(\cdot)^T$ represents transposition;
the linearized error equation in step 3 is defined as:

$$r_{i+1_{vel}} = \hat{r}_{i+1_{vel}} + H_{i+1_{vel}} \tilde{x}_{i+1}$$

$$\hat{r}_{i+1_{vel}} = {}^R \hat{V}_{i+1} - {}^R V_{i+1_m}$$

wherein $r_{i+1_{vel}}$ represents the velocity residual at the (i+1)th radar sampling moment, $\hat{r}_{i+1_{vel}}$ represents the velocity residual initial value at the (i+1)th radar sampling moment, ${}^R \hat{v}_{i+1}$ is the IMU predicted value of the velocity in the radar local coordinate system at the (i+1)th radar sampling moment, $H_{i+1_{vel}}$ is the Jacobian matrix at the (i+1)th radar sampling moment, and $\tilde{x}_{i+1}$ is the error state at the (i+1)th radar sampling moment.

7. The vehicle 4D millimeter-wave radar inertial odometry method according to claim 6, wherein:
acquiring n-nearest neighbor points, in a local map, of each three-dimensional point in the three-dimensional point cloud of the radar-preprocessed data at the next radar sampling moment in step 4 specifically comprises:
constructing a local map by three-dimensional point clouds of the radar-preprocessed data in the past multiple radar sampling moments through an incremental dynamic k-d tree (ikdtree) tree strategy, and obtaining n-nearest neighbor points, in the local map, of each three-dimensional point in the three-dimensional point cloud of the radar-preprocessed data at the next radar sampling moment through k-Nearest Neighbors (KNN) search in the local map;
constructing a spatial point matching constraint from point cloud to local map, a matching error equation and a linearized matching error equation in step 4 specifically comprises:
weighting an average Euclidean distance from each three-dimensional point in the three-dimensional point cloud of the radar-preprocessed data at the next sampling moment to the corresponding n-nearest neighbor points through a local point cloud spatial distribution covariance method to obtain an average weighted distance from distribution to multi-distribution, and forming a spatial point matching constraint from point cloud to local map, so as to construct a matching error equation and a linearized matching error equation.

8. The vehicle 4D millimeter-wave radar inertial odometry method according to claim 7, wherein:
the matching error equation is defined as $$r_{i+1_{pro}} = G_{i+1} \left( \sum_{\tau=1}^{n} {}^G b_\tau / n - {}^G T_{R_{i+1}} \cdot \rho_{i+1} \right)$$

-continued $$^{G}T_{R_{i+1}} = \begin{bmatrix} ^{G}R_{I_{i+1}} & ^{G}l_{I_{i+1}} \\ 0_{1\times3} & 1 \end{bmatrix} \begin{bmatrix} ^{I}R_{R_{i+1}} & ^{I}l_{R_{i+1}} \\ 0_{1\times3} & 1 \end{bmatrix}$$

$$G_{i+1} = \left( \sum_{\tau=1}^{n} C_{\tau}^{B} / n + {}^{G}T_{R_{i+1}} \cdot C^{A} \cdot {}^{G}T_{R_{i+1}}^{T} \right)^{-\frac{1}{2}}$$

wherein $r_{i+1_{pro}}$ represents the point cloud matching residual, $\rho_{i+1}$ is the coordinates of the radar observation point in the radar coordinate system at the (i+1)th radar sampling moment, $^{G}b_{\tau}$ is the coordinates of n-nearest neighbor points in the $\rho_{i+1}$ local map in the global coordinate system, and is a transformational matrix from global coordinate system to radar coordinate system, $G_{i+1}$ is the distance weighted matrix from distribution to multi-distribution at the (i+1)th radar sampling moment, $^{G}T_{R_{i+1}}$ is the transformation matrix from radar local coordinate system to global coordinate system, $^{G}R_{I_{i+1}}$ represents the attitude at the (i+1)th radar sampling moment, $^{G}l_{I_{i+1}}$ is the position at the (i+1)th radar sampling moment, $^{I}R_{R_{i+1}}$ is the rotational extrinsic parameter between IMU and radar at the (i+1)th radar sampling moment, $^{I}l_{R_{i+1}}$ is the rotational extrinsic parameter between IMU and radar at the (i+1)th radar sampling moment, $0_{1\times3}$ represents a 0 vector with one row and three columns, $C^{A}$ is the spatial distribution covariance corresponding to the current point $\rho_{i+1}$, and $$C_{\tau}^{B}$$

is the spatial distribution covariance corresponding to the nearest neighbor point $^{G}b_{\tau}$;

the linearized matching error equation is defined as:

$$r_{i+1_{pro}} = \hat{r}_{i+1_{pro}} + H_{i+1_{pro}} \tilde{x}_{i+1}$$

wherein $\hat{r}_{i+1_{pro}}$ is the initial value of the matching residual at the (i+1)th radar sampling moment, $H_{i+1_{pro}}$ is the matching Jacobian matrix at the (i+1)th radar sampling moment, and $\tilde{x}_{i+1}$ is the error state at the (i+1)th radar sampling moment;

the maximum a posteriori estimation problem of the matching constraint in step 4 is defined as:

$$\min_{\tilde{x}^{\kappa}} \left( \left\| (\hat{x}_{i+1}^{\kappa} \boxminus \bar{x}_{i+1_{vel}}) + J_{i+1}^{\kappa} \tilde{x}_{i+1}^{\kappa} \right\|_{\bar{P}_{i+1_{vel}}^{-1}}^{2} + \sum_{\zeta=1}^{\Pi} \left\| {}^{\zeta}\hat{r}_{i+1_{pro}}^{\kappa} + {}^{\zeta}H_{i+1_{pro}}^{\kappa} x_{i+1_{pro}}^{\kappa} \right\|_{{}^{\zeta}R_{i+1_{pro}}^{-1}}^{2} \right)$$

wherein $\bar{x}_{i+1_{vel}}$ is the state at the (i+1)th radar sampling moment after the velocity is updated, $\bar{P}_{i+1_{vel}}$ is the covariance matrix at the (i+1)th radar sampling moment after the velocity observation is updated, $$^{\zeta}R_{i+1_{pro}}^{-1}$$

is the observation noise of the $\zeta$th point in the processed data at the (i+1)th radar sampling moment, $\Pi$ is the number of effective observations in the radar point cloud frame at the (i+1)th radar sampling moment, $$\hat{X}_{i+1}^{\kappa}$$

is the state updated value obtained by the $\kappa$th iterative Kalman filtering at the (i+1)th radar sampling moment, $\tilde{x}_{i+1}^{\kappa}$ is the error state corresponding to the $\kappa$th iterative Kalman filtering at the (i+1)th radar sampling moment, $$J_{i+1}^{\kappa}$$

is a $\hat{x}_{i+1}^{\kappa} \boxminus \bar{x}_{i+1_{vel}}$ to $\tilde{x}^{\kappa}$ linearized Jacobian matrix, $$^{\zeta}\hat{r}_{i+1_{pro}}^{\kappa}$$

represents the initial value of the matching residual corresponding to the $\zeta$th radar observation point in the $\kappa$th iteration at the (i+1)th radar sampling moment, $$^{\zeta}H_{i+1_{pro}}^{\kappa}$$

represents the matching Jacobian matrix corresponding to the $\zeta$th radar observation point in the $\kappa$th iteration at the (i+1)th radar sampling moment, $\boxminus$ is the state quantity subtraction operation, in which the rotational state quantity conforms to the right multiplication inverse disturbance, and the others conform to the vector subtraction operation, and $\|\cdot\|$ represents the Euclidean distance;

the iterative Kalman updated system state is defined as follows:

$$\hat{x}_{i+1}^{\kappa+1} = \hat{x}_{i+1}^{\kappa} \boxplus \left( -K_{i+1_{pro}}^{\kappa} r_{i+1_{pro}} + (I - K_{i+1_{pro}}^{\kappa} H_{i+1_{pro}}^{\kappa})(J^{\kappa})^{-1})(\hat{x}_{i+1}^{\kappa} \boxminus \bar{x}_{i+1_{vel}}) \right)$$

$$P_{i+1}^{\kappa+1} = (I - K_{i+1_{pro}}^{\kappa} H_{i+1_{pro}}^{\kappa}) P_{i+1}^{\kappa}$$

wherein:

$$\hat{X}_{i+1}^{\kappa+1}$$

is the state obtained by the $\kappa$th iterative Kalman filtering at the (i+1)th radar sampling moment, $$K_{i+1_{pro}}^{\kappa}$$

is the matching Kalman gain of the Kth iteration filtering at the (i+1)th radar sampling moment, $r_{i+1_{pro}}$ represents the point cloud matching residual, I is identity matrix, $P_{i+1}$ is the covariance matrix updated by matching at the (i+1)th radar sampling moment, $$P_{i+1}^{\kappa}$$

is the covariance matrix updated by the th iterative filtering, $P_{i+1}{}^{\kappa+1}$ is the covariance matrix updated by the $\kappa+1$th iterative filtering, $$H_{i+1}^{\kappa}{}_{pro}$$

is the matching Jacobian matrix in the $\kappa$th iteration at the $(i+1)$th radar sampling moment, $\boxplus$ is a state quantity addition operation, in which the rotational state quantity conforms to the right multiplication disturbance and the others conform to the vector subtraction operation, and $\boxminus$ is a state quantity subtraction operation.

9. A computer-readable medium, storing a computer program executed by an electronic device, wherein when running on the electronic device, the computer program causes the electronic device to execute the steps of the method according to claim 1.

\* \* \* \* \*